July 16, 1968 R. F. SANFORD 3,393,379
FREQUENCY CONTROL CIRCUIT UTILIZING SWITCHING MEANS
Filed Nov. 30, 1966
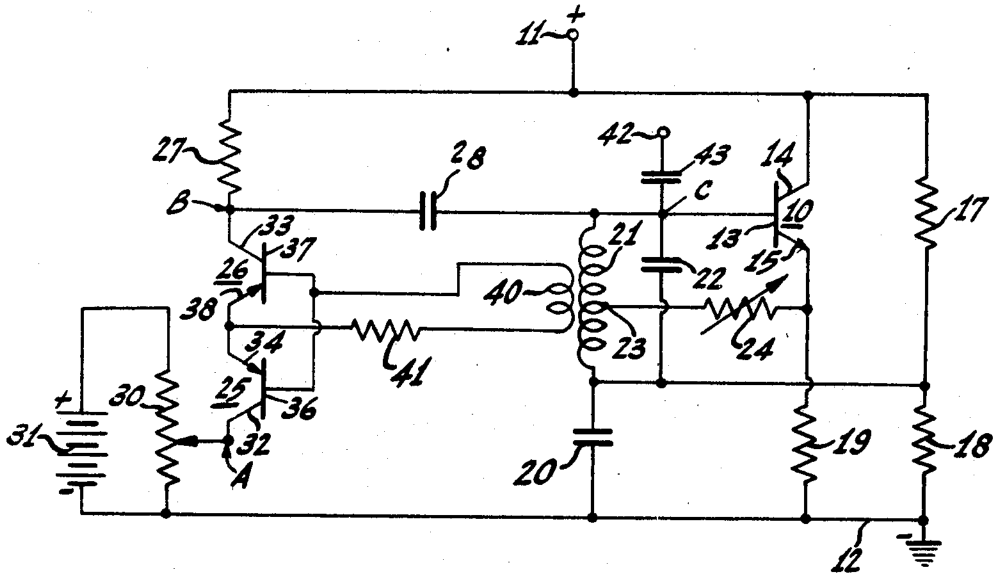
Inventor:
ROBERT F. SANFORD
BY Edward J. Norton
Attorney United States Patent Office 3,393,379

Patented July 16, 1968

3,393,379
FREQUENCY CONTROL CIRCUIT UTILIZING SWITCHING MEANS

Robert F. Sanford, Princeton, N.J., assignor to Radio Corporation of America, a corporation of Delaware Filed Nov. 30, 1966, Ser. No. 597,957
6 Claims. (Cl. 331—117)

ABSTRACT OF THE DISCLOSURE

A pair of transistor devices are connected as a normally open switch with one terminal of the switch coupled to the frequency determining resonant circuit of an oscillator. The one terminal of the switch is coupled to a first terminal of a voltage supply, and a second terminal of the switch is coupled to a second terminal of the voltage supply. A voltage variable input source is coupled between the second terminal of the switch and the second terminal of the voltage supply. A gating circuit for the switch is coupled to the frequency determining circuit of the oscillator so that the switch becomes closed only during a portion of each cycle of the alternating current signal. The switch is operated by the gating circuit and in response to the output voltage of the variable source to provide a true reactance control across the frequency determining resonant circuit of the oscillator, thereby varying the frequency of the alternating current signal generated by the oscillator substantially linearly with the input voltage.

This invention relates to transistor switching circuits, and particularly to an improved transistor switching circuit for varying the frequency of an oscillator or other tuned circuits in applications where a linear relationship between voltage and percent of frequency change is desired.

It is an object of this invention to provide an improved transistor switching circuit for varying the frequency of a tuned circuit where a substantially constant shift in frequency per change in voltage is desired.

Briefly, the invention will be described as used with a voltage tunable oscillator arranged to generate an alternating current signal at a given frequency. A pair of transistor devices are connected as a normally open switch with one terminal of the switch coupled to the frequency determining resonant circuit of the oscillator. A voltage variable source (a D.C. input voltage or a modulating signal) is coupled to a second terminal of the switch. A gating circuit for the switch is coupled to the frequency determining resonant circuit of the oscillator so that the switch becomes closed during only a portion of each cycle of the alternating current signal. The switch is operated by the gating circuit and in response to the output of the voltage variable source so that by its design the switch provides a true reactance control across the frequency determining resonant circuit of the oscillator, thereby, varying the frequency of the alternating current signal generated by the oscillator substantially linearly with the input voltage.

A more detailed description of the invention will now be given in connection with the accompanying drawing in which the single figure is a circuit diagram of a frequency modulated oscillator constructed in accordance with one embodiment of the invention.

An oscillator similar to that defined as a Hartley-type oscillator is shown. Transistor 10 is shown illustratively as an NPN junction transistor which is biased for conduction by a voltage for example, +6 volts, applied at a terminal 11. The positive terminal of a source of undirectional potential (not shown) is indicated as being connected to terminal 11 with a negative terminal of the source being connected to a conductor 12 at ground or other reference potential. The collector 14 of the transistor 10 is connected to the terminal 11 and to the conductor 12 through series connected resistors 17 and 18. A capacitor 20 is connected across the D.C. biasing resistor 18 to ground to provide A.C. bypass to ground. A resistor 19 is connected between the emitter 15 of transistor 10 and conductor 12 or ground to provide proper biasing. The frequency determining circuit for the oscillator comprises a parallel resonant circular including an inductor 21 and a capacitor 22 connected in parallel between the base 13 of transistor 10 and the junction of the voltage divider resistors 17 and 18. The emitter 15 of transistor 10 is coupled to a tap 23 on inductor coil 21 through a variable resistor 24 to provide the correct amount of feedback to the parallel resonant circuit to sustain oscillations. The level of feedback and quality in waveform is controlled by the variable resistor 24.

In accordance with the embodiment of the invention presented, the frequency of the oscillator including the transistor 10 can be modulated by adding a true reactance circuit which can be made to look either inductive or capacitive to the frequency determining circuit of the oscillator. A pair of transistors 25 and 26, illustrated as PNP junction transistors, are provided. The collector 32 of transistor 25 is coupled to the wiper arm of a potentiometer 30 which for illustrative purposes may be varied to provide at point A between 0 and +12 volts. A 12-volt battery 31 is shown connected across the potentiometer 30 to provide the voltage source. In practice, any suitable source of a modulating input signal voltage can be used in place of the battery 31 and potentiometer 30. The collector 33 of the transistor 20 is coupled through a load resistor 27 to the terminal 11 and is also connected to one side of a capacitor 28 at point B. The other side of capacitor 28 is connected to the base 13 of transistor 10 and to the junction of capacitor 22 and inductor 21. The emitters 34 and 38 of transistors 25 and 26 are coupled together and the bases 36 and 37 of transistors 25 and 26 are coupled together. An inductor 40 is preferably wound on the same bobbin as inductor 21, providing good coupling to the low impedance output link inductor 40. One terminal of inductor 40 is connected to the junction of the bases 36 and 37, and the opposite terminal of the inductor 40 is coupled through a resistor 41 to the junction of the emitters 34 and 38. The resistor 41 limits the base current in the transistors 25 and 26 to within a reasonable amount. An output terminal 42 is shown coupled by a capacitor 43 to the junction of the inductor 21 and capacitor 22 at point C, although as is understood the output may be taken elsewhere from the oscillator according to the application.

In operation, transistor 10 and the associated circuit elements function in a conventional manner as an oscillator, producing an output alternating current signal at terminal 42 of a frequency determined by the values of the inductor 21, capacitor 22 and of the other components included in the frequency determining circuit of the oscillator. Transistors 25 and 26 are normally nonconducting so that the switch formed thereby is normally open. Inductor 40 serves to couple a sample of the alternating current from the parallel resonant circuit including inductor 21 and capacitor 22 to the bases 36 and 37 of the respective transistors 25 and 26. The switch including the two transistors 25 and 26 is responsive to the applied alternating current such that both transistors 25 and 26 will conduct, causing the switch formed thereby to close for a portion of each cycle of the alternating current. Because of the contact potentials on the transistors 25 and 26, the switch formed by the two transistors 25 and 26 closes for a period less than one-half cycle or 180 degrees of the alternating current. Thus, when the alternating current is phased such as to make the emitters 34 and 38 negative with respect to the respective bases 36 and 37, the transistors 25 and 26 act as diodes connected back-to-back. At least one or the other of the transistors 25 and 26 appears as a high impedance regardless of the instantaneous polarity of the input voltage at point A, and the switch formed by the two transistors 25 and 26 remains open. No current flows in the collector circuit of transistor 26 or through any load connected thereto.

During the next approximately half-cycle when the emitters 34 and 38 become positive with respect to the respective base electrodes 36 and 37 such that transistors 25 and 26 can conduct, the switch closes. During that portion of a cycle of the alternating current when the switch formed by the transistors 25 and 26 is closed, alternating current can flow therethrough. The direction in which the alternating current flows through the two transistors 25 and 26 at the time the switch formed thereby is closed and the magnitude thereof depends on the level of the voltage appearing at point A relative to the voltage at point C.

A given setting exists for the wiper arm on the potentiometer 30 such that for an input voltage provided at point A by a lower voltage setting of the wiper arm than the given setting, current will flow from the frequency determining circuit of the oscillator through the switch consisting of transistors 25 and 26 to the ground return 12. The circuit including the capacitor 28 and transistors 25 and 26 looks in effect inductive to the parallel resonant circuit including inductor 21 and capacitor 22 of the oscillator, thus, raising the oscillating frequency of the oscillator by an amount determined by the actual voltage at point A. For a higher setting of the wiper arm on the potentiometer 30 than the given setting, current will flow in the opposite direction from the point A to the frequency determining circuit of the oscillator through the closed switch formed by the conducting transistors 25 and 26. The circuit including the capacitor 28 and the transistors 25 and 26 now looks in effect capacitive to the parallel resonant circuit of inductor 21 and capacitor 22, and the frequency of the oscillator is lowered by an amount determined by the voltage at point A. The transistor switching circuit so provided thus acts as a true reactance. By varying the voltage at point A in accordance with an input modulating signal or other means such as the potentiometer 30, a frequency modulator having a linear relationship between output frequency and change in input voltage or modulating signal is provided.

In describing a typical operation of the embodiment shown in the drawing, it has been assumed that the inductor 40 is wound on the same bobbin as inductor 21 in a direction so that transistors 25 and 26 conduct during that portion of the cycle of the alternating current across the parallel resonant circuit including inductor 21 and capacitor 22 to provide the foregoing results. It is to be understood that by reversing the direction of the winding of inductor 40, the transistors 25 and 26 conduct during a portion of the alternating current cycle approximately 180° removed from the previous example, therefore, providing an opposite reactance condition to that described above across the resonant circuit.

By way of example, an oscillator constructed in the manner of that shown in the drawing had the following component values:

| | | |
|---|---|---|
| Capacitor 20 | μf/15 v | 22 |
| Capacitor 22 | μf | .05 |
| Capacitor 28 | μf | .0047 |
| Inductor 21 | mh | 100 |
| Inductor 40 | turns on inductor 21 | 200 |
| Resistors 17, 18 | ohms | 510 |
| Resistor 19 | do | 2K |
| Resistor 24 | do | 5K |
| Resistor 27 | do | 3K |
| Resistor 30 | do | 5K |
| Resistor 41 | do | 200 |
| Battery | volts | +12 |
| Transistor 10 | | RCA 2N647 |
| Transistors 25, 26 | | RCA 2N217 |
| Voltage at terminal 11 | volts | +6 |

The change in frequency with the component values given above was approximately ±10% at 2.25 kc./sec. for the voltage variation of 0 to 12 volts. Shift in frequency was found to be an approximately constant value over the whole range of input voltage with any deviation from linear being related to the source impedance of the voltage applied at point A.

What is claimed is:

1. A variable frequency oscillator having a resonant circuit and a control circuit for varying the tuning of said circuit, said control circuit comprising:
   switch means coupling a current source to said resonant circuit during a certain portion of each cycle of oscillation of said oscillator to apply current from said current source through said resonant circuit in a selected one of two directions during said portion of each cycle, and
   control means coupled to said switch means having at least first and second conditions for directing the current from said source in solely a first selected direction through said resonant circuit during said portion of each cycle when said control means is in said first condition and for directing the current from said source in solely said second selected direction through said resonant circuit during said portion of each cycle when said control means is in said second condition.

2. The combination as claimed in claim 1 wherein said switch means includes a pair of transistors and means coupled to said resonant circuit for biasing said transistor to provide a closed circuit for a period less than one-half of each cycle of oscillation of said oscillator.

3. In combination,
   a circuit for generating oscillations of a given alternating current frequency,
   first and second transistors each having base, emitter and collector electrodes,
   means connecting the base electrodes of said transistors together and connecting the emitter electrodes of said transistors together,
   a capacitor,
   means coupling said collector electrode of said first transistor through said capacitor to said circuit,
   first and second terminals adapted to be coupled to a power source,
   means coupling said collector electrode of said first transistor to said first terminal and means including a variable voltage source coupling said collector electrode of said second transistor to said second terminal for applying operating potentials to said circuit and to said transistors so that said transistors are normally non-conducting to form a normally open switch across said circuit,
   and means for coupling said base electrodes and said emitter electrodes to said circuit to cause said transistors to conduct thereby closing said switch only during less than one-half of said alternating current cycle so that the circuit including said transistors and said capacitor operates as a true reactance across said first-mentioned circuit to vary the frequency of said oscillations substantially linearly with the output of said source.

4. The combination as claimed in claim 3 and wherein,
   said first-mentioned circuit includes a parallel connected inductor and capacitor for determining in part the frequency of said oscillations,
   said means for coupling said base electrodes and said emitter electrodes to said first-mentioned circuit includes a second inductor mutually coupled to said first-mentioned inductor with one terminal of said second inductor coupled to the common connection of said base electrodes and the other terminal of said second inductor coupled to the common connection of said emitter electrodes.

5. In combination, a transistor having base, emitter and collector electrodes, a parallel-connected inductor and capacitor, means connecting said parallel-connected inductor and capacitor with said electrodes to form an oscillator which generates alternating current oscillations of a frequency determined in part by the value of sadi inductor and capacitor, a junction of said inductor and said capacitor being connected to said base electrode, first and second terminals adapted to be coupled to a power source, means coupled across said terminals for applying operating potentials to said oscillator, second and third transistors each having base, emitter and collector electrodes, a second capacitor, means connecting said collector electrode of said second transistor to said first terminal and through said second capacitor to said junction, means including a variable voltage source connecting said collector electrode of said third transistor to said second terminal, means for applying said alternating current as generated by said oscilltaor between said emitter electrodes of said second and third transistors and said base electrodes of said second and third transistors, the potentials applied to said electrodes of said second and third transistors being determined to cause said second and third transistors to conduct at the same time only during a portion of said alternating current cycle to present a true reactance to said oscillator which serves to vary the frequency of said oscillations substantially linearly with said variable voltage.

6. In combination, a transistor having base, emitter and collector electrodes, a parallel-connected inductor and capacitor, means connecting said parallel-connected inductor and capacitor with said electrodes to form an oscillator which generates alternating current oscillations of a frequency determined in part by the value of said inductor and capacitor, a junction of said inductor and said capacitor being connected to said base electrode, first and second terminals adapted to be coupled to a power source, means coupled between said terminals for applying operating potentials to said oscillator, second and third transistors each having base, emitter and collector electrodes, a second capacitor, means connecting said collector electrode of said second transistor to said first terminal and through said second capacitor to said junction, means including a variable voltage source connecting said collector electrode of said third transistor to said second terminal, a second inductor having a pair of terminals and mutually coupled to said first inductor, means connecting one terminal of said second inductor to said base electrodes of said second and third transistors, means connecting the second terminal of said second inductor to said emitter electrodes of said second and third transistors, the potentials applied to said electrodes of said second and third transistors being determined to cause said second and third transistors to conduct at the same time for only less than a given one-half of said alternating current cycle to present a true reactance to said oscillator which serves to vary the frequency of said oscillations substantially linearly with said variable voltage.

References Cited

UNITED STATES PATENTS

| | | | |
|---|---|---|---|
| 2,610,318 | 9/1952 | Clark | 331—177 X |
| 2,930,991 | 3/1960 | Edwards | 331—117 |

FOREIGN PATENTS

| | | |
|---|---|---|
| 928,953 | 6/1963 | Great Britain. |

ROY LAKE, *Primary Examiner.*

S. H. GRIMM, *Assistant Examiner.*